Figure 1:
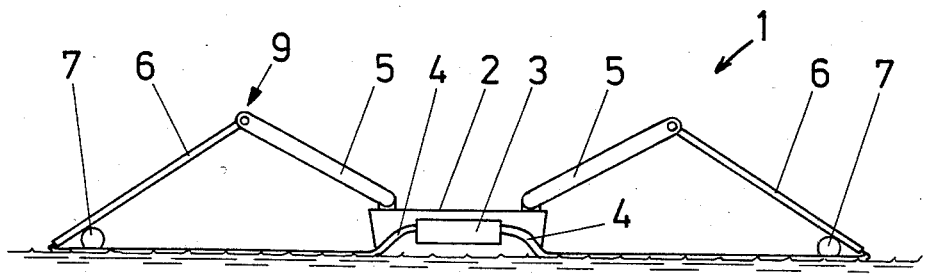

United States Patent [19]

Lundin

[11] Patent Number: 4,559,137
[45] Date of Patent: Dec. 17, 1985

[54] BOOM STRUCTURE IN AN OIL-SPILL-COMBATTING SYSTEM

[75] Inventor: Lars Lundin, Porvoo, Finland

[73] Assignee: Oy Lars Lunden Patent AB, Helsinki, Finland

[21] Appl. No.: 591,559

[22] Filed: Mar. 20, 1984

[30] Foreign Application Priority Data

Mar. 22, 1983 [FI] Finland .............................. 830955

[51] Int. Cl.$^4$ .............................................. E02B 15/04
[52] U.S. Cl. .................... 210/242.3; 210/923; 114/123
[58] Field of Search ............... 210/242.2, 242.3, 923, 210/242.4; 114/123

[56] References Cited

U.S. PATENT DOCUMENTS

| | | | |
|---|---|---|---|
| 705,188 | 7/1902 | Zimer | 114/123 |
| 3,348,690 | 10/1967 | Cornelissen | 210/242.3 |
| 3,730,346 | 5/1973 | Prewitt | 210/242 |
| 3,990,975 | 11/1976 | McLellan | 210/242.4 |
| 4,052,313 | 10/1977 | Rolls | 210/242.4 |
| 4,209,400 | 6/1980 | Mayes | 210/242.1 |

Primary Examiner—Richard V. Fisher
Assistant Examiner—Sharon T. Cohen
Attorney, Agent, or Firm—Lewis H. Eslinger

[57] ABSTRACT

The invention relates to a boom structure in an oil-spill-combatting system. The principle of the apparatus is as follows: from the water craft (2) there extends to each side a boom, and the ends of the collecting rope (4) are secured to the ends of the booms. The oil is recovered from the rope by running the rope (4) through an apparatus (3) which is situated at the aft of the craft (2). The rope is run first in one direction and then in the opposite direction. According to the invention the rope is put into effective use, up to the last meter, by making the booms from two sections (5, 6), of which the outer one (6) turns synchronically with the passage of the rope (4) and brings each rope end alternately next to the recovery apparatus (3).

6 Claims, 5 Drawing Figures

BOOM STRUCTURE IN AN OIL-SPILL-COMBATTING SYSTEM

The present invention relates to a boom structure in an oil-spill-combatting system, a boom structure which is secured to the hull structures of an oil-spill-combatting water craft and by means of which an oil-collecting rope is maintained spread into an oil-collecting arch.

In the state of the art there are known boom structures which are made up of single-section booms extending out from the oil-spill-combatting craft directly sideward, the ends of the oil-collecting rope being secured to the ends of the booms. The said boom structure functions relatively well, although it also has some disadvantages. Thus, the extension of the single-section boom is quite limited, and the length obtained for the collecting rope with the said boom structure is not very great, and also, the booms are the poorer in use the higher the waves. Under open-sea conditions the conventional boom structures are often unusable.

A further disadvantage of rigid-boomed systems lies in that the rope which has been secured to the end of the boom can be passed through the oil-removing apparatus at the aft of the craft only in such a way that a run of rope somewhat longer than the boom is left unused at each end. If the total length of the rope is 40 m, the length of the boom is 10 m and the width of the craft 4 m, a simple calculation shows that 24 m, i.e. 60% of the rope, is out of use.

The object of the present invention is to provide a boom structure which is highly usable under all operating conditions and which is, especially under open-sea conditions, superior to conventional boom structures. The advantages of the boom structure according to the invention have been achieved in the manner presented in the accompanying claims as being characteristic.

Figure 2:
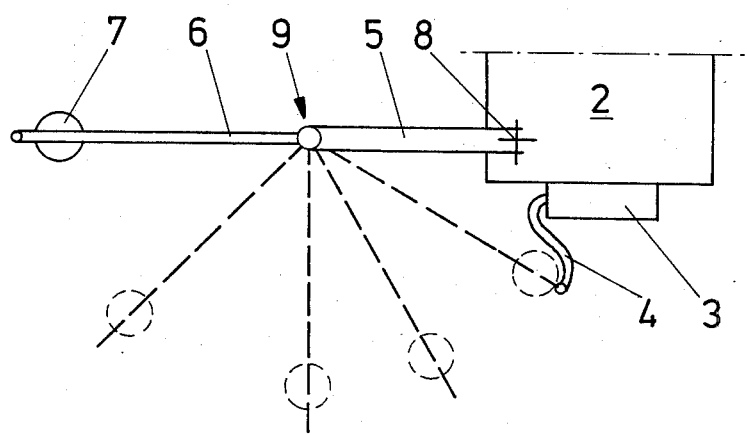
Figure 3:
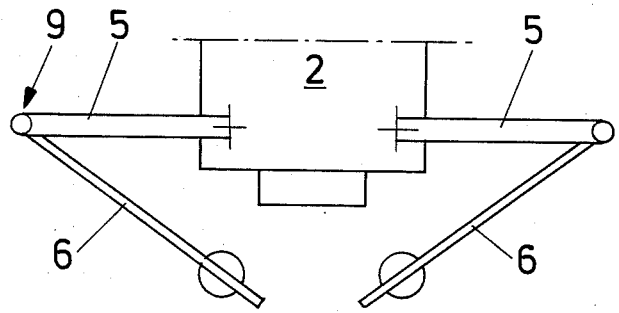
Figure 4:
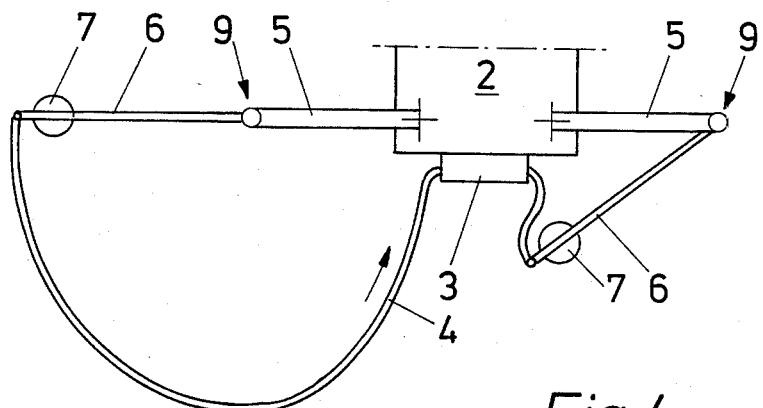
Figure 5:
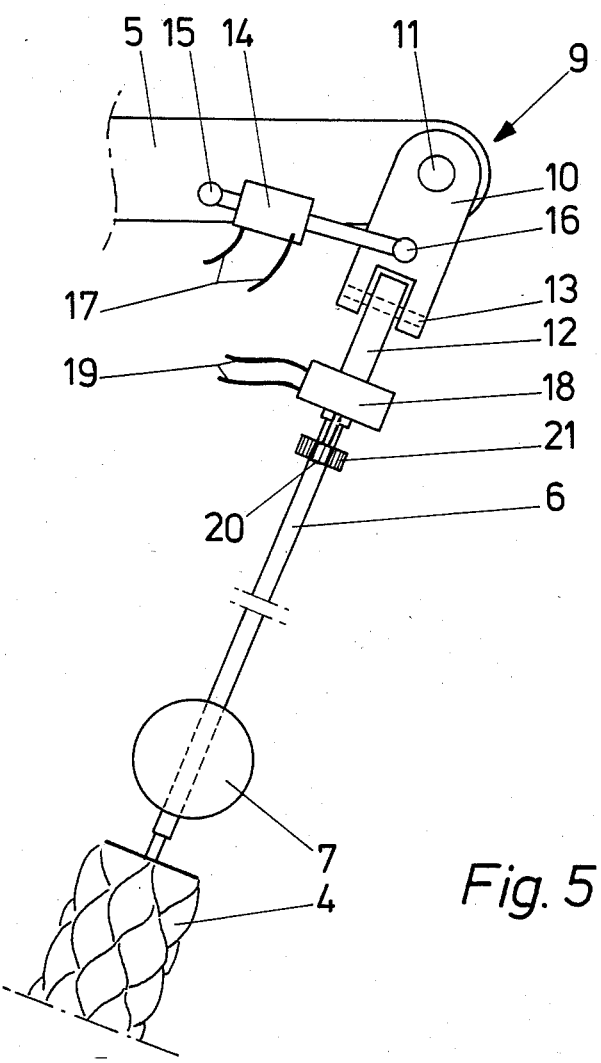

The invention is described below in greater detail with reference to the accompanying schematic drawings, in which FIG. 1 depicts the overall formation of the boom structure according to the invention as seen directly from behind the craft to which the booms are secured, FIG. 2 depicts the movements of a boom secured to a boat, in different operating positions, FIG. 3 depicts the position of the booms when the boat passes through narrow channels, straits, or the like, FIG. 4 depicts a plan view of the boom structure according to the invention in one extreme position, and FIG. 5 depicts the structure of a boom section in greater detail.

FIG. 1 depicts a back view of the boom structure according to the invention, fitted to a water craft. The system 1 thus consists of a water craft 2, to which booms supporting the collecting rope 4 are secured on both sides, usually close to the aft. In practice the collecting is carried out in such a way that oil is removed in an oil-removing apparatus indicated by way of reference by numeral 3 from the collecting rope 4 being passed through the said apparatus in such a way that the rope is run through the apparatus 3 alternately in each direction. The outer ends of the collecting rope 4 are secured to the outer ends of the booms. The boom structure according to the invention consists of two parts 5, 6, which are articulated to each other by means of an articulation 9. The purpose of the articulation 9 is to allow the outer boom section 6, supported by its float 7, to be raised and lowered by the wave action, whereby an advantage is gained in that, when the said boom structure is used, even high waves do not cause operational disturbances, as often happens when a continuous boom is fixed to a water craft 2. Thus the outer sections 6 of the boom, which are usually longer than the inner sections 5, can rise and descend, about the articulations 9, completely freely along with the waves.

FIG. 2 shows a second advantage of the boom structure according to the invention, which is achieved specifically using a double-section boom, namely, that the outer section 6 of the boom, supported by its float 7, can be moved at the level of the water surface in such a way that the section 6 moves through a section of a conical surface when moving from one extreme position to the other. The purpose of such a movement is that, whereas conventionally rigid booms leave at both ends a run of nearly 10 meters of rope which in practice does not carry out any oil collecting, by using the system according to the present invention even this run of rope can be passed virtually all the way through the recovery apparatus 3. In practice this is achieved in such a way that the outer sections of the booms move snychronically with the operation of the recovery apparatus 3 in such a way that the outer boom section 6 on one side of the craft 2 is as straight as possible, i.e. maximally extended from the edge of the craft, while the outer section 6 on the opposite side is bent maximally close to the recovery apparatus 3. When the travel direction of the rope through the recovery apparatus 3 is reversed, the outer sections 6 of the booms on the opposite sides of the craft 2 begin to move in such a way that the boom section which has been closer to the recovery apparatus begins to move away from the recovery apparatus 3 and, respectively, the outer section 6 of the other boom begins to move towards the recovery apparatus 3. The synchronization to the rope movements can be effected simply by means of, for example, the drive wheel passing the rope through the apparatus 3.

FIG. 3 presents a situation in which the craft 2 is passing through a narrow channel or strait, where the outer boom sections 6 extended directly outwards would encumber passage or could even prevent it. In such cases the synchronized transfer of the outer boom sections 6 in the same direction can be discontinued and both outer sections can be bent, for example, to the position depicted in FIG. 3, or close to it, in which case the width of the craft, measured from one boom articulation 9 to the other, is very small, usually smaller than the width of a conventional oil-spill-combatting craft.

Especially as regards the position depicted in FIG. 3, one more fact must be pointed out, namely, that the said boom position is standard when moving from one place to another without collecting oil. For this rapid transfer the outer sections 6 can be provided with suitable supports, which can specifically be secured to the aft of the craft 2, and the booms 6 can be raised from water to rest supported by them. Of course, for the said purpose it is possible, for example, to install in the area of the articulations 9 devices for lifting the booms from water automatically, or at least in such a way that the booms need not be gripped manually. The construction of such a device is an easy task for those skilled in the art.

FIG. 4 depicts a top view of a situation in which the booms are in one extreme position, in which the ends of the outer sections 6 of the booms are on one side maximally close to the recovery apparatus 3 and on the other side maximally extended away from it. Correspondingly, when the rope 4 is run in the direction of the arrow, the situation changes in such a way that the outer section 6 of the boom seen on the left in FIG. 4 turns towards the recovery apparatus 3 and the right-side boom in FIG. 4 turns maximally away from it.

FIG. 5 depicts an embodiment in which the articulation, indicated in previous figures by 9, of the boom structure according to the invention has been solved, and also an arrangement by means of which the outer boom sections 6 can be moved synchronically between their extreme positions, in addition to which there is presented one more principle, according to which the collecting rope 4 can be rotated in a simple manner. The inner section 5 of the boom is quite sturdy, and it is articulated, as is shown by way of example in FIG. 2 with reference numeral 8, in such a way that it can be raised and lowered according to need by means of, for example, a hydraulic cylinder, which has been omitted from the drawings for the sake of simplicity. The end of the inner section 5 of the boom is, for example, flattened in the horizontal direction and provided with a bearing pin 11, to which a part 10 has been articulated in such a way that its end facing the bearing pin 11 forks to the two sides of the flattened boom 5 end. A similar notch system has also been made at the other end of the piece 10, although at an angle of 90° in relation to the first-mentioned notch, the boom section 12 being articulated by means of a bearing pin 13 to the last-mentioned notch.

The boom arrangement according to the invention is highly suitable for use also in connection with an arrangement in which the collecting rope 4 is rotatable. Thus, FIG. 5 also depicts a simplified apparatus by means of which the outer section 6 of the boom can be rotated, at which time the steel rope 4 secured to the outer end of the section 6 also rotates. The outer section 6 of the boom is mounted to the boom section 12 in a suitable manner, for example in such a way that the section 6 engages inside the section 12. In this case the joint between the sections 6 and 12 is readily rotatable but still maintains torques and other similar forces at such a level that there is no risk of the joint opening up or breaking. In the example case depicted in FIG. 5 there is attached to the boom section 12 a hydraulic motor 18, the hydraulic hoses of which are indicated by reference numeral 19, there being attached to the shaft protruding from the motor a gear wheel 20 the teeth of which intermesh with the gear wheel 21 mounted around the boom 6, from which it follows that when the hydraulic motor rotates also the boom 6 rotates, and at the same time the rope 4.

FIG. 5 shows how the hydraulic cylinder, articulated at its ends to bearing pins 15 and 16, is installed between the inner boom section 5 and the articulation section 10. The purpose of the cylinder is to cause the outer section 6 of the boom to turn in one direction or the other, usually synchronically in the rhythm of the movement of the rope 4 through the oil-removing apparatus 3. As can be seen by way of example from the figure, the turning in no way has a detrimental effect on the movements of the outer section 6 of the boom in the vertical direction, i.e. the movements caused by waves. Reference numeral 17 indicates the connections of the hydraulic hoses to the cylinder 14.

FIG. 5 also presents a simple solution to the supporting of the boom 6 at its outer end, and this solution comprises a float ball 7, which is substantially symmetrically around the boom section 6 and fastened to it, in which case the said float supports the outer end of the boom 6 on the water surface. Of course, other solutions obvious to a professional can also be used.

I claim:

1. A boom and collecting rope structure for an oil-spill-combatting system mounted on a water craft, which comprises a pair of booms, each boom being an assembly formed of at least two sections connected end to end by an articulation element and each boom being pivotally connected at one end to a respective side of the water craft, a collecting rope connected in a loose manner between an outer, free end of each of said pair of booms, an oil-removing means provided on the water craft and receiving the collecting rope for removing collected oil therefrom, means for causing reciprocal movement of the rope through said oil-removing apparatus, whereby the rope alternately forms loops on each side of the oil-removing apparatus, an outer section of the assembly forming each boom being pivotable around the articulation element when the outer end of the outer section is at the level of the water surface, so that movements of said outer sections of the respective assembly are synchronous with the movement of the rope through the oil-removing apparatus, whereby the maximally extended position of the outer section of the boom on one side of the water craft corresponds to the outer section of the boom on the other side of the water craft being a minimal distance from the oil-removing apparatus.

2. A structure according to claim 1, characterized in that the pivotable movement of the outer sections of the assembly forming each boom at the level of the water surface is produced by means of hydraulic cylinders.

3. A structure according to claim 1, characterized by rotating means arranged so that an outer section of the boom is also rotatable about a respective longitudinal axis in order to rotate the boom section and the rope secured to it.

4. A structure according to claim 3, characterized in that the rotating means for rotating the outer section of the boom comprises a hydraulic motor.

5. A structure according to claim 4, characterized in that the articulation element consists of a pin-and-bushing combination, the hydraulic motor for rotating the boom being fastened to the outer end of the section of the assembly forming the boom that protrudes from the pin-and-bushing combination and rotating, by means of gear wheels, the boom section attached with bearings to the boom section.

6. A structure according to claim 1, characterized in that said articulation element includes means whereby the outer sections of the boom are both movable to a position behind the water craft for passage through narrow channels.

* * * * *